United States Patent
Cohen et al.

(10) Patent No.: US 7,805,003 B1
(45) Date of Patent: Sep. 28, 2010

(54) IDENTIFYING ONE OR MORE OBJECTS WITHIN AN IMAGE

(75) Inventors: Scott D. Cohen, Mountain View, CA (US); Gregg D. Wilensky, Pacific Palisades, CA (US)

(73) Assignee: Adobe Systems Incorporated, San Jose, CA (US)

( * ) Notice: Subject to any disclaimer, the term of this patent is extended or adjusted under 35 U.S.C. 154(b) by 811 days.

(21) Appl. No.: 10/716,782

(22) Filed: Nov. 18, 2003

(51) Int. Cl.
*G06K 9/34* (2006.01)
*G06K 9/00* (2006.01)

(52) U.S. Cl. ................................ 382/173; 382/103
(58) Field of Classification Search ............... 382/199, 382/164–172, 103, 266, 281, 203
See application file for complete search history.

(56) References Cited

U.S. PATENT DOCUMENTS

| | | | |
|---|---|---|---|
| 5,588,072 A | 12/1996 | Wang | |
| 5,844,570 A * | 12/1998 | Curtright et al. | 345/629 |
| 5,854,853 A | 12/1998 | Wang | |
| 6,018,590 A * | 1/2000 | Gaborski | 382/168 |
| 6,094,508 A * | 7/2000 | Acharya et al. | 382/199 |
| 6,128,414 A * | 10/2000 | Liu | 382/266 |
| 6,298,157 B1 | 10/2001 | Wilensky | |
| 6,337,925 B1 | 1/2002 | Cohen et al. | |
| 6,404,921 B1 * | 6/2002 | Ishida | 382/197 |
| 6,614,930 B1 * | 9/2003 | Agnihotri et al. | 382/176 |
| 6,665,439 B1 * | 12/2003 | Takahashi | 382/199 |
| 6,778,698 B1 * | 8/2004 | Prakash et al. | 382/164 |
| 6,912,298 B1 | 6/2005 | Wilensky | |
| 6,944,319 B1 * | 9/2005 | Huang et al. | 382/118 |
| 7,003,161 B2 * | 2/2006 | Tessadro | 382/199 |
| 7,295,700 B2 | 11/2007 | Schiller et al. | |
| 2002/0030634 A1 * | 3/2002 | Noda et al. | 345/5 |
| 2003/0039394 A1 * | 2/2003 | Yamazaki | 382/176 |
| 2004/0037460 A1 * | 2/2004 | Luo et al. | 382/165 |
| 2008/0056553 A1 | 3/2008 | Rimm et al. | |

FOREIGN PATENT DOCUMENTS

| | | |
|---|---|---|
| JP | 9-062782 A | 7/1979 |
| JP | 5-174183 A | 7/1993 |
| JP | 6-035982 A | 2/1994 |

(Continued)

OTHER PUBLICATIONS

Borges et al; "A Split-and-Merge Segmentation Algorithm for Line Extraction in 2-D Range Images"; Image and Visiion Computing 15 (1997); 769-780; Jan. 17, 1997.*

(Continued)

*Primary Examiner*—Vu Le
*Assistant Examiner*—Andrae S Allison
(74) *Attorney, Agent, or Firm*—Fish & Richardson P.C.

(57) ABSTRACT

Methods and apparatus, including computer program products, implementing techniques for identifying one or more objects within an image. The techniques include receiving an image that includes at least one object; identifying a plurality of edge pixels in the image, an edge pixel being a pixel that borders two contrasting areas of the image, the plurality of edge pixels including both inner edge pixels and outer edge pixels; and finding a substantially connected component correlated with each object, the substantially connected component comprising a set of the edge pixels that are connected by traversing substantially only edge pixels.

52 Claims, 10 Drawing Sheets

FOREIGN PATENT DOCUMENTS

| | | |
|---|---|---|
| JP | 7-234918 A | 9/1995 |
| JP | 7-262312 A | 10/1995 |
| JP | 8-163328 A | 6/1996 |
| JP | 8-212298 A | 8/1996 |
| JP | 9-120430 A | 5/1997 |
| JP | 9-135331 A | 5/1997 |

OTHER PUBLICATIONS

Borges et al; "A split-and-merge segmentation algorithm for line extraction in 2D range images"; Pattern Recognition, 2000. Proceedings. 15th International Conference on vol. 1, Sep. 3-7, 2000 pp. 441-444 vol. 1.*

Westman et al, "Color segmentation by hierarchical connected components analysiswith image enhancement by symmetric neighborhood filte", IEEE, Pattern Recognition, 1990. Proceedings., 10th International Conference on Jun. 16-21, 1990, vol. i, On pp. 796-802 vol. 1.*

Chang et al, A Component-Labeling Algorithm Using Contour Tracing Technique, Document Analysis and Recognition, 2003. Proceedings. Seventh International Conference on, Publication Date: Aug. 3-6, 2003 on pp. 741-745.*

Ulead Systems [online]. Ulead, 2006 [retrieved on Aug. 18, 2008]. Retrieved from Internet Archive database: URL:http://web.archive.org/web/20030804001945/http://www.ulead.com/aboutulead/press/pr11-18-02.htm.

EPSON Stylus CX3100 [online]. EPSON 2003 [retrieved on Aug. 18, 2008]. Retrieved from Internet Archive database: URL:http://web.archive.org/web/20030804064606/http://www.epson.com.sg/html/body_cx3100_-_epson_stylus_cx3100.html.

Technical Support [online]. Ulead, 2003 [retrieved on Aug. 18, 2008]. Retrieved from Internet Archive database: URL:http://web.archive.org/web/20040917145213/http://support.ulead.com/kb/0006/KB514.htm.

Latest in Scanners [online]. CNETAsia, 2008 [retrieved on Aug. 18, 2008]. Retrieved from Internet Archive database: URL:http://web.archive.org/web/20031101154237/http://asia.cnet.com/reviews/hardware/scanners/.

Naoki Enomoto et al., On the Free-format Document Recognition Systems, Electronic Information Communication Society Technical Report, Japan, Society of Electronic Information Communication, Feb. 19, 1998, vol. 97 No. 558, p. 99-104.

Japanese Office Action mailed Feb. 10, 2009 in Japanese Application Serial No. 11-52158.

* cited by examiner

IDENTIFYING ONE OR MORE OBJECTS WITHIN AN IMAGE

BACKGROUND OF THE INVENTION

The present invention relates to identifying one or more objects within an image.

Scanners are commonly used to produce a digital representation of an object (a photograph or a business card). Often, the scanned object is smaller than the scanner image size, so the result of the scan is a larger digitized image containing the embedded object. Rather than scan each object individually, a common scanning technique is to scan multiple objects together. Such a technique is referred to as "gang scanning". The result of a gang scanning operation is a single scanner image that contains multiple embedded objects. Before the embedded object can be used, it needs to be extracted from the scanner image. Before the embedded object can be extracted, however, its location must be identified.

SUMMARY OF THE INVENTION

In general, in one aspect, the present invention provides methods and apparatus, including computer program products, implementing techniques for identifying multiple objects within a scanned image. The techniques include receiving a scanned image that includes multiple objects; and identifying the multiple objects by (1) generating an edge pixel map of the image, the edge pixel map identifying each pixel in the image as being an edge pixel or a non-edge pixel, an edge pixel being a pixel that borders two contrasting areas of the image; (2) scanning the edge pixel map until an edge pixel is found; (3) computing a connected component containing the edge pixel, the connected component being a set of edge pixels that are connected by traversing only edge pixels; (4) extracting one of the multiple objects from the connected component; (5) erasing from the edge pixel map all the edge pixels that belong to the connected component or that are enclosed by the extracted object; and (6) repeating steps (2) through (5) until no more edge pixels are found.

In general, in another aspect, the present invention provides methods and apparatus, including computer program products, implementing techniques for identifying one or more objects within an image. The techniques include receiving an image that includes at least one object; identifying a plurality of edge pixels in the image, an edge pixel being a pixel that borders two contrasting areas of the image, the plurality of edge pixels including both inner edge pixels and outer edge pixels; and finding a substantially connected component correlated with each object, the substantially connected component comprising a set of the edge pixels that are connected by traversing substantially only edge pixels.

Particular implementations can include one or more of the following features. The image includes more than one object. Identifying a plurality of edge pixels includes computing a gradient value for each of a plurality of pixels in the image. Computing the gradient value for a given pixel includes comparing pixel color in a neighborhood of pixels surrounding the given pixel. Computing the gradient value for a given pixel includes using an image smoothing filter to filter noise from the image.

The techniques further comprise passing each component to a processor that extracts the location of the object from the component. The techniques further comprise refining the extracted location. The techniques further comprise using the extracted location to crop the object from the image. The techniques further comprise splitting a component into two components. The techniques further comprise merging two components into a single component.

The techniques further comprise extracting the location of each object from the image; and using the extracted object location to seed a crop operation. Using the extracted object location to seed a crop operation includes for each object in the image, using the extracted object location to define a cropping area; and cropping all the defined cropping areas in a single cropping operation. The extracted object location specifies how the object is aligned with respect to the image; and using the extracted object location to define a cropping area includes using the alignment of the object to define the alignment of the cropping area.

The techniques further comprise, prior to cropping all the defined cropping areas, adjusting one or more of the defined cropping areas in response to user input. Adjusting one or more of the defined cropping areas includes merging two cropping areas into a single cropping area. Adjusting one or more of the defined cropping areas includes splitting a single cropping area into two or more cropping areas.

The techniques of the invention can be implemented to realize one or more of the following advantages. One implementation provides all of the following advantages.

The techniques can be implemented to automate the process of identifying the location of embedded objects within the image and to be robust to noise present in the image.

The techniques can be implemented to make no assumptions as to the number, size, shape or location of the embedded objects within the image. In other words, the user can place any number of objects of any size or shape on the scanner platen in any orientation (not necessarily aligned with the edge of the platen), and the techniques will identify the number of embedded objects and the location of each embedded object. Rather than search for a particular object shape, the techniques search for a connected component, which can be any shape.

The techniques can be implemented to make no assumptions as to the background color of the image or the type of scanner that is used. In other words, the identification process works regardless of the background color of the image and of the type of scanner that is used. The use of image differences (gradients) enables the identification process to be background color and scanner independent.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

Figure 1:
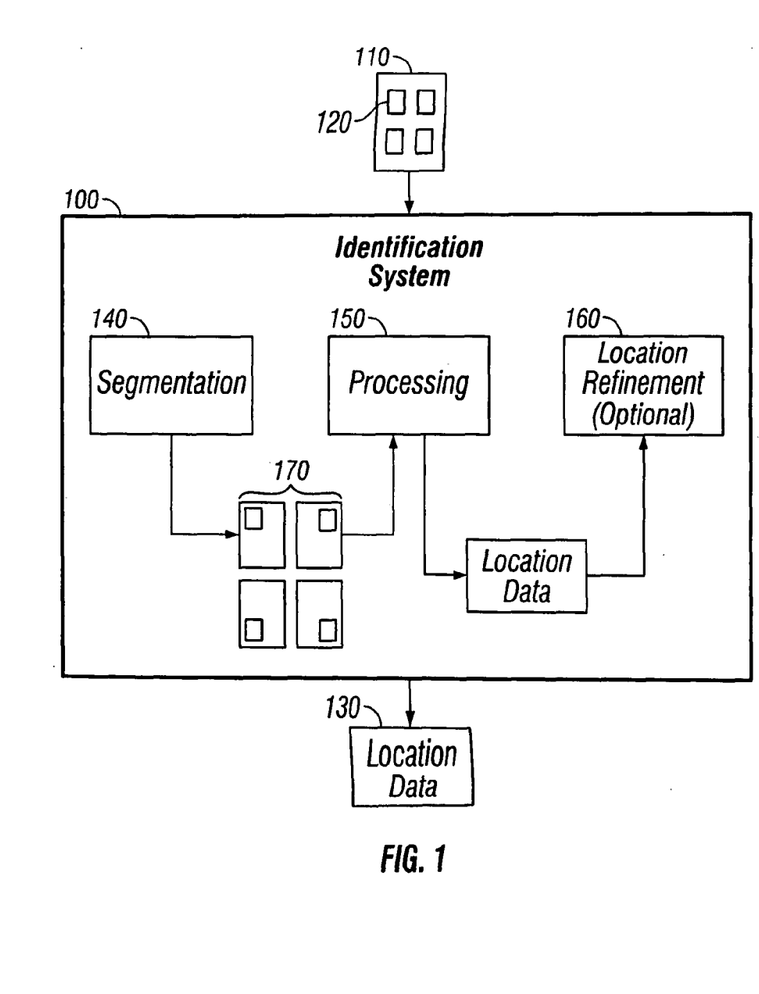
FIG. 1 is a block diagram of a system in accordance with the invention.

As shown in FIG. 1, a system 100 for identifying embedded objects within an image in accordance with the invention is operable to receive an input image 110 that contains at least one embedded object 120 and to produce output 130 that specifies the location of each of the embedded objects. The output 130 can then be used in one or more post-identification operations, for example, cropping, rotating or aligning the embedded objects.

In general, the identification system 100 performs the identification regardless of the number, size, shape or location of the embedded objects within the image, and regardless of the background color of the image or the type of scanner that is used. However, in some implementations, certain constraints are imposed. In one implementation, the system assumes that there is a small amount of space between objects and that the background color is roughly a uniform color. In another implementation, the system can run in a single-object mode or in a multiple-object mode. In the single-object mode, the system assumes that there is only one object in the image. In the multiple-object mode, the system assumes that there are two or more objects in the image. The system is configured to run in one of the modes by default unless the user selects otherwise. Alternatively, before the identification process is performed, the system can ask the user "Is there more than one object in the image?" and set the mode accordingly.

As shown in FIG. 1, the identification system 100 includes a segmentation module 140, a processing module 150 and, optionally, a location refinement module 160. The segmentation module 140 divides the input image 110 into multiple segments 170, each segment correlating to exactly one embedded object. The system passes each segment to the processing module 150. The processing module 150 processes each image segment 170 and identifies the location of the embedded object. The location refinement module 160 refines the location identified by the processing module 150.

Figure 2:
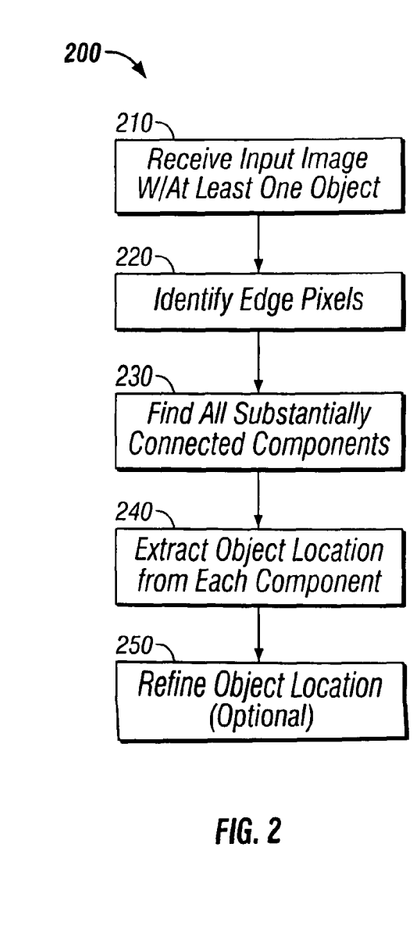
FIG. 2 is a flow diagram of a method in accordance with the invention.

In operation, as shown in FIG. 2, the identification system 100 receives an input image 110 that contains one or more embedded objects 120, and passes the input image 110 to the segmentation module 140 (step 210). The segmentation module 140 identifies edge pixels within the input image (step 220) and uses the edge pixels to find all connected, or substantially connected, components (step 230). The segmentation module 140 passes each component to the processing module 150, which extracts the location of the embedded objects from each component (step 240). Optionally, the extracted location can be passed to the location refinement module 160 for refinement of the extracted location (step 250). The following paragraphs describe these techniques in more detail.

What are Edge Pixels and how are they Identified?

Figure 3:
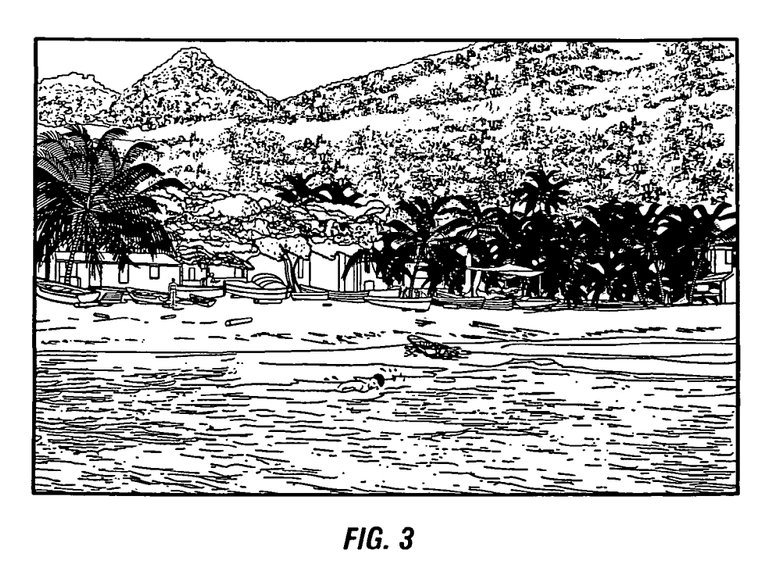
FIG. 3 illustrates an input image that contains at least one embedded object.

An edge pixel is a pixel that borders two contrasting areas of the image. For example, as shown in the input image 300 of FIG. 3, the pixel 310 is an edge pixel because in a local neighborhood 320 of pixels surrounding pixel 310, there is a contrast between a first area 330 of the neighborhood and a second area 340 of the neighborhood. The contrast can be a function of color, texture, or of any other property of the pixel, but for illustration purposes, the following description assumes a contrast of color. If the contrast is texture-based, then the assumption about the background color being roughly uniform can be relaxed.

Figure 4A:
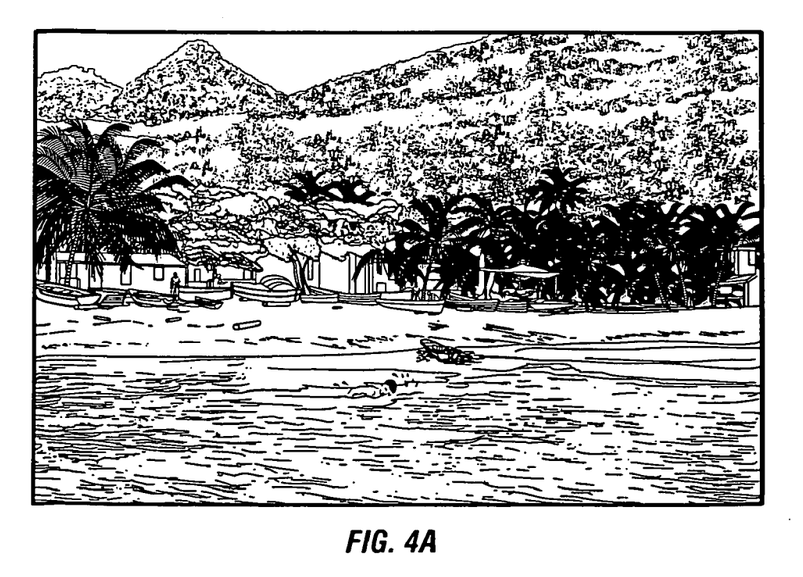
FIG. 4A illustrates computed gradient values for the input image.
Figure 4B:
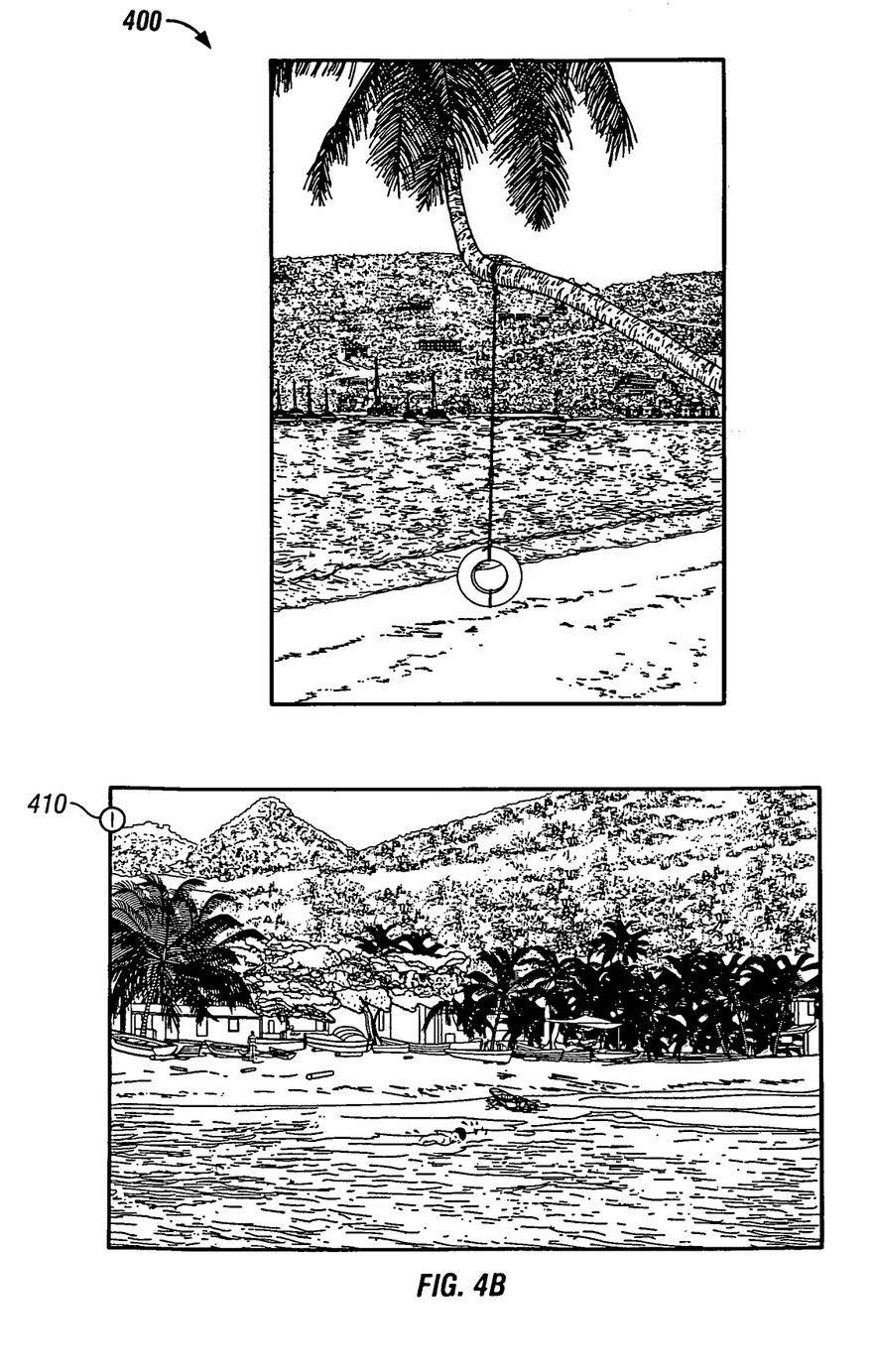
FIG. 4B illustrates thresholded gradient values for the input image.

In one implementation, to determine whether a given pixel of the image is an edge pixel, the segmentation module computes a gradient value for the pixel, and if the gradient value is above a threshold value, the pixel is identified as an edge pixel. FIG. 4A illustrates the gradient values computed for the image 300; the darker the pixel, the higher the gradient value. FIG. 4B illustrates the thresholded gradient values for the image 300. The black pixels are the edge pixels and the white pixels are the non-edge pixels. The collection of thresholded gradient values for the image will be referred to as an edge pixel map 400.

What is a Gradient and how is it Computed?

A gradient is a measure of change or contrast. The segmentation module computes the gradient value for a given pixel by comparing the color (or other property, as described above) of pixels in a neighborhood of pixels surrounding the given pixel to determine a change in color. For images with multiple color channels, the gradient values for individual color channels can be combined to produce a gradient value that represents the overall color difference.

Noise Filtering

In one implementation of the gradient computation, before the comparing the colors of pixels, an image-smoothing filter is applied to reduce the effect of noise. For example, if the color of the neighboring pixel is black but it is surrounded by all white pixels, then the smoothing filter would change the neighboring pixel's color to a color that is more representative of the neighborhood, for example, to light gray or to white. The representative color can be, for example, the average color in the neighborhood. The average can be a weighted average, for example, a Gaussian average that weights the center pixel in the neighborhood the most, and reduces the weight as the distance from the center increases.

In one implementation, the gradient is represented as a vector that has a direction indicating the direction of change and a magnitude indicating the amount of change. The gradient value is the magnitude of the gradient vector and is computed by first computing the gradient vector and then computing the magnitude of the vector.

One method for computing the gradient vector and magnitude is illustrated mathematically as follows:

$$[S\_x, S\_y] = [(d/dx)(G\_sigma * S), (d/dy)(G\_sigma * S)]$$

$$G = \operatorname{sqrt}((S\_x)^2 + (S\_y)^2)$$

Alternatively, instead of computing $(d/dx)(G\_sigma*S)$ and $(d/dy)(G\_sigma*S)$, the segmentation module can equivalently compute $(dG\_sigma/dx)*S$ and $(dG\_sigma/dy)*S$. This is a more efficient computation. The computation speed can be further increased by taking advantage of the fact that the convolutions are separable. In these equations, $S\_x$ is an image that contains the derivative of the input image S in the x-direction. Sy is an image that contains the derivative of the input image S in the y-direction. G is the gradient magnitude image: $G(c,r)$ holds the magnitude of the gradient vector $(S\_x(c,r), Sy(c,r))$ at the pixel $(c,r)$. The operators d/dx and d/dy compute the derivatives in the x- and y-directions, respectively, and "*" denotes convolution. G is the gradient magnitude. G_sigma is the Gaussian filter that is used to smooth the image S as described above. The sigma controls the size of the neighborhood.

Size of Neighborhood

The size of the neighborhood used in the gradient computation can be set to a particular default size (e.g., 21 pixels by 21 pixels) and the segmentation module can then expand or decrease that size depending on the resolution of the image or the spacing between objects in the image. The larger the spacing between objects, the larger the size of the neighborhood can be. In general, increasing the neighborhood size increases the degree of robustness to noise that is achieved by the filtering. However, a drawback to increasing the neighborhood size is that nearby edges from two separate objects may become blurred together and a single connected component could be found for the two separate objects. Another drawback is that the larger the neighborhood, the more time it takes to compute the gradient.

Thresholding the Gradient

Once a gradient value is computed, it is thresholded (compared against a threshold value). If the gradient value for a given pixel is above the threshold value, it is identified as an edge pixel. Otherwise, it is identified as being a non-edge pixel.

The segmentation module can employ a variety of techniques to determine the threshold value. One technique is to use a predetermined threshold value determined empirically. Another method is to generate a custom threshold value for each input image based on characteristics of the image, for example, the degree of contrast between the object and the background of the image. The information specifying the image characteristics can be received from the user through a user interface to the identification module. This user interface will be described in more detail below.

The segmentation module uses the edge pixel map to find a connected or substantially connected component that correlates with an embedded object.

What is a Connected or Substantially Connected Component and how is it Found?

Figure 5A:
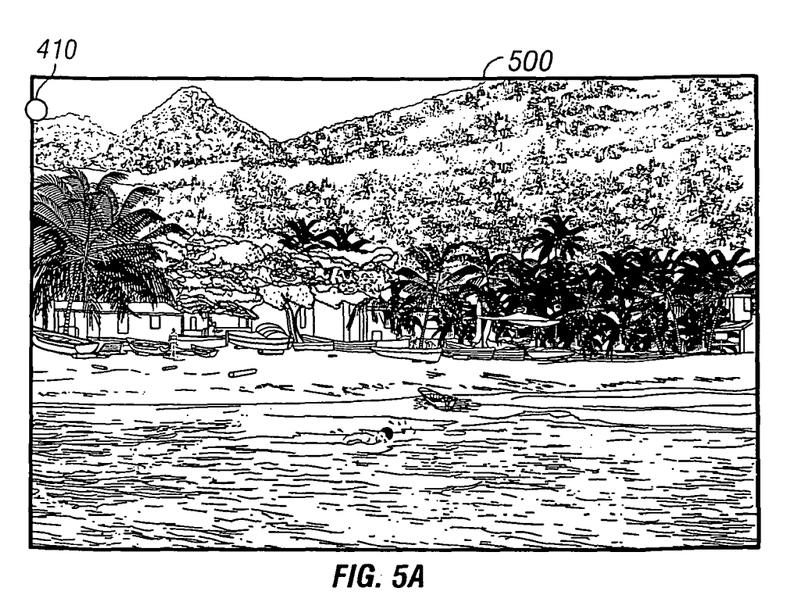
FIG. 5A illustrates a connected component.
Figure 5B:
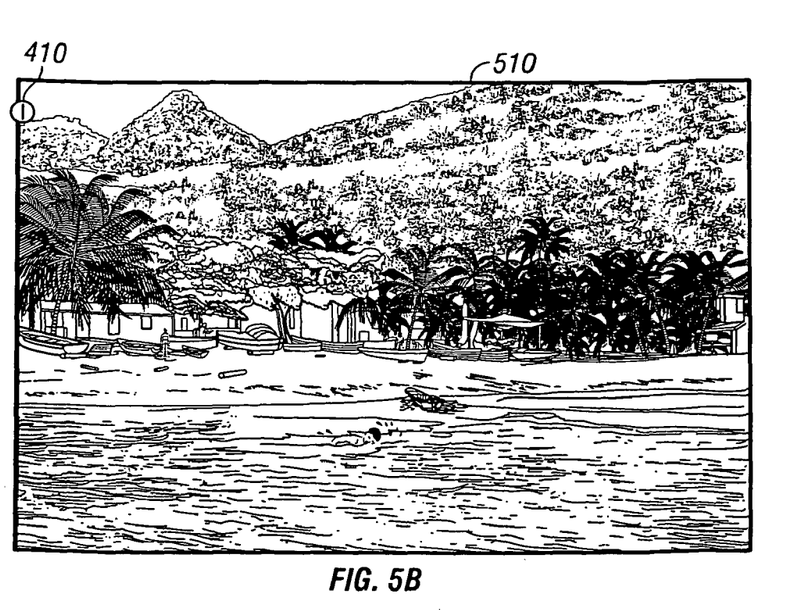
FIG. 5B illustrates a substantially connected component.

A connected component is a set of the edge pixels that are connected by traversing only edge pixels. A substantially connected component is a set of the edge pixels that are connected by traversing substantially only edge pixels. FIG. 5A illustrates a connected component 500 for the image 300. Notice that a portion 410 of the edge pixel map (FIG. 4B) for the image 300 is missing from the connected component 500. That is because the portion 410 is surrounded entirely by non-edge pixels and therefore is not reachable by traversing only edge pixels. FIG. 5B illustrates a substantially connected component 510 for the same image 300. As shown, in the case of a substantially connected component, the portion 410 is included because the substantially connected component can include non-edge pixels, as will be explained below.

The segmentation module identifies a connected or substantially connected component by scanning the image row by row, starting with the top row. Each time an edge pixel is found, the segmentation module computes the connected or substantially connected component that contains that edge pixel.

Figure 6A:
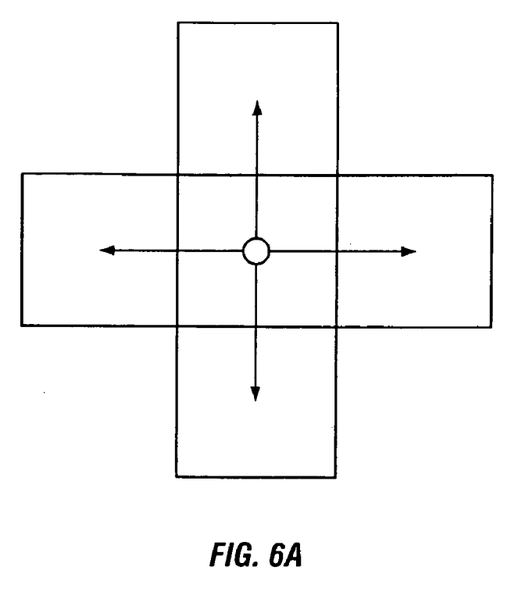
FIG. 6A illustrates a four-connected traversal.
Figure 6B:
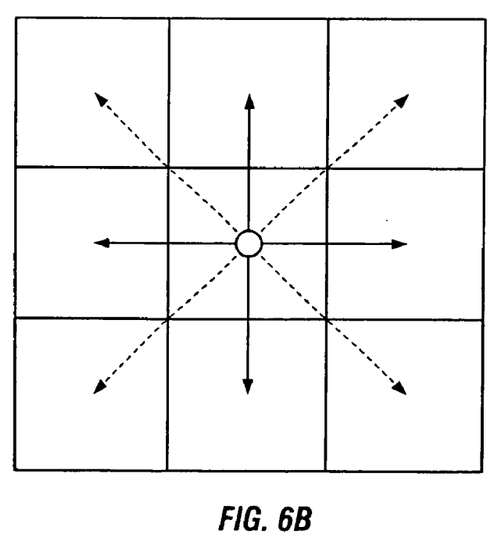
FIG. 6B illustrates an eight-connected traversal.

The segmentation module computes a connected component by starting at the located edge pixel and repeatedly traversing along adjacent edge pixels until a non-edge pixel is reached. Adjacent pixels are pixels that are directly above, below, to the right or to the left of the current pixel (shown in FIG. 6A). In one implementation, pixels that are diagonal to the current pixel are also adjacent pixels (FIG. 6B). Each edge pixel that is traversed is marked as being part of the connected component.

Figure 7:
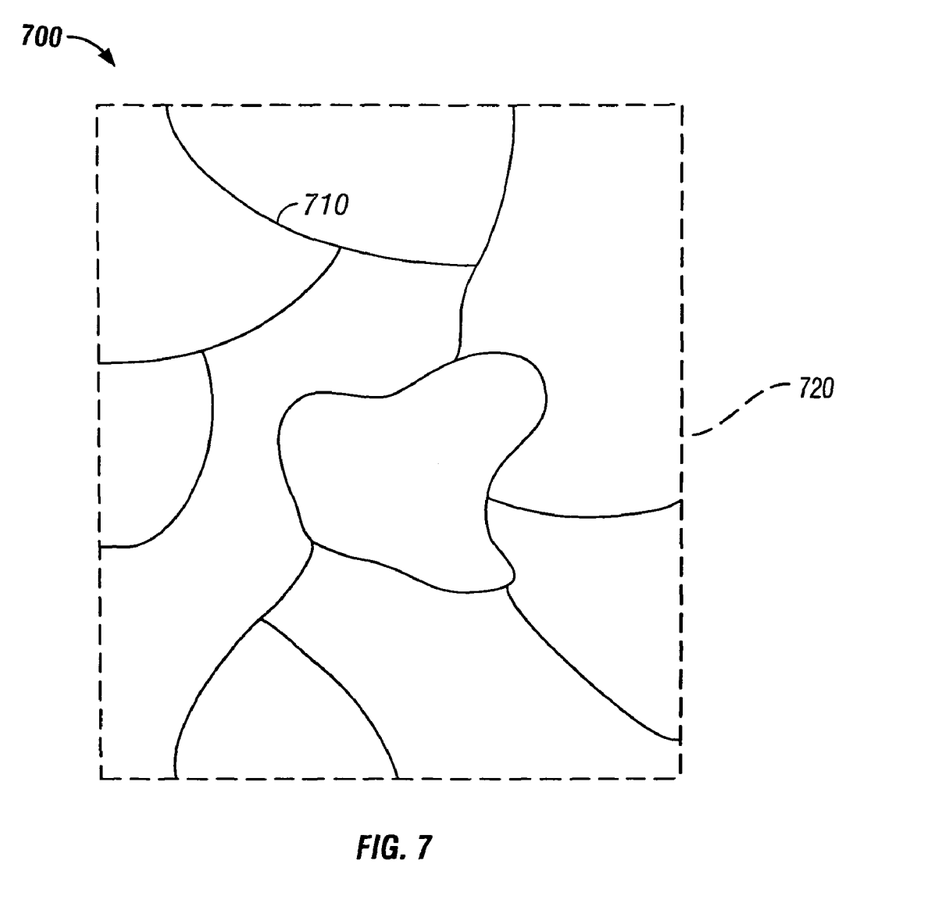
FIG. 7 illustrates inner and outer edge pixels.

The connected component need not include the entirety of the perimeter of the object. For example, as shown in FIG. 7, the connected component 700 can contain both inner 710 and outer 720 edge pixels. Inner edge pixels are edge pixels that correlate with the interior of the embedded object. Outer edge pixels are edge pixels that correlate with the exterior or perimeter of the embedded object.

A substantially connected component is computed by using a traversal algorithm that has a certain level of tolerance for non-edge pixels. Movement along non-edge pixels is allowed up to a certain number of non-edge pixels. The tolerance level can be set based on user input specifying the desired tolerance level, or can be determined automatically, for example, as a function of the spacing between objects.

In one implementation, the tolerance level is set to zero, thereby requiring each computed component to be entirely connected, not just substantially connected. In such an implementation, the portion 410 of the edge pixel map that is missing from the connected component 500 would be computed as a separate component.

For each computed component, the segmentation module passes the component to the processing module 150 for extraction of the object from the component, and continues the row-by-row scan in search of the next edge pixel. Before continuing the scan, the segmentation module erases all the edge pixels that belong to the component, so that the component is not re-discovered during the subsequent scan. The segmentation module also erases edge pixels inside the extracted object to prevent the discovery of objects embedded inside other objects.

Extraction of Object from the Component

Figure 8A:
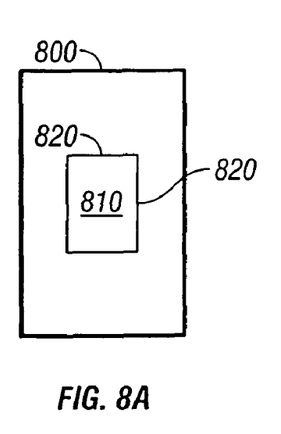
FIG. 8A illustrates an extracted object location.

In one implementation, the segmentation module first creates a bounding area that surrounds the computed component and passes the bounding area to the processing module. The processing module can use a variety of techniques to perform the extraction. In one implementation, the processing module uses different techniques for different types of objects. One such technique for extracting rectangular objects such as photographs and business cards is described in U.S. Pat. No. 6,298,157 entitled "Locating and Aligning Embedded Images", the contents of which are incorporated herein by reference. The output of the extraction includes data that specifies the location of the embedded object. For example, as illustrated in FIG. 8A, for the object 810 embedded within image 800, the location data specifies the outer edges 820 of the object 810. The output also includes orientation and size information for the object 810.

Error Checking (Optional)

Optionally, the system performs error checking on the extracted object 810. Error checking involves checking the extracted object against a set of expected object characteristics such as size, dimensions, or aspect ratio (expressed as a minimum, maximum, or expected value). For example, if the expected object is a 4"×6" rectangular object but the extracted object is a 0.01"×0.01" object, then this object is discarded. This error checking step helps to eliminate very small or oddly-shaped objects that can result from scanner background noise.

Refinement of Extracted Object Location (Optional)

Figure 8B:
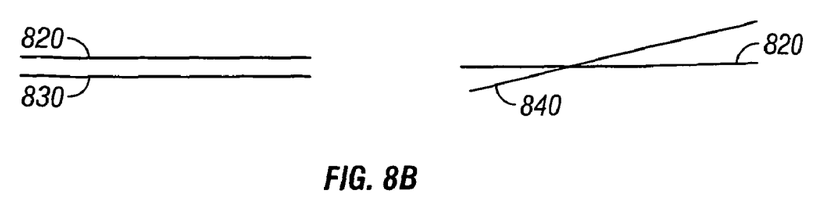
FIGS. 8B and 8C illustrate refinement of the extracted object location.

Optionally, the system passes each extracted object to the location refinement module for refinement of the extracted object location. The location refinement module refines the extracted location by making slight adjustments to the location and testing whether the adjustments produce a better fitting location. For example, as illustrated in FIG. 8B, for an edge 820, the location refinement module 160 can make a slight adjustment to the edge 820 to produce a shifted edge 830 or a rotated edge 840. To test whether the adjustments produce a better fit, the location refinement module 160 can add up the gradient values for each pixel along the adjusted edge 830 or 840, compare the sum with a corresponding sum for the unadjusted edge 820, and select the edge 820, 830 or 840 with the highest gradient sum.

The location refinement module repeats the above-described adjustments for each edge 820 of the object. In some cases, the location refinement module 160 skips one or more of the edges 820 and leaves them unrefined. For example, edges 820 that lie too close to the edge of the image 800 are skipped because the gradient values are less reliable towards the edge of the image 800.

Figure 8C:
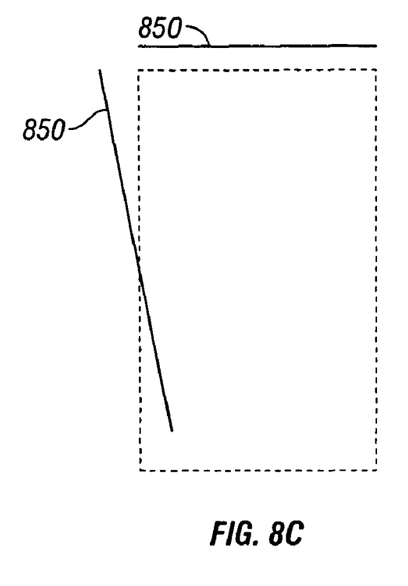

After adjustment, the resulting edges 850 may no longer connect with each other, as illustrated in FIG. 8C. To address this, the location refinement module 160 makes some further adjustments to connect together all the refined edges 850.

In one implementation, the location refinement module uses information about the expected object to perform the further adjustments. For example, in the case of rectangular objects, the location refinement module extends the refined edges 850 to intersect and form a quadrilateral, and then computes a rectangle (referred to as the best fitting rectangle) that best approximates the quadrilateral in terms of area and that shares an edge with the quadrilateral.

One technique for computing the best fitting rectangle involves computing both the largest inscribed rectangle that shares an edge with the quadrilateral and the smallest bounding rectangle that shares an edge with the quadrilateral and then selecting one of the two to be the best fitting rectangle. The selection is configured such that if the inscribed rectangle differs in area from the quadrilateral by less than a threshold amount, then the inscribed rectangle is chosen as the best fitting rectangle. Otherwise, the bounding rectangle is chosen as the best fitting rectangle.

The output of the location refinement module is location data corresponding to the location of the best fitting rectangle.

Merging

Figure 9:
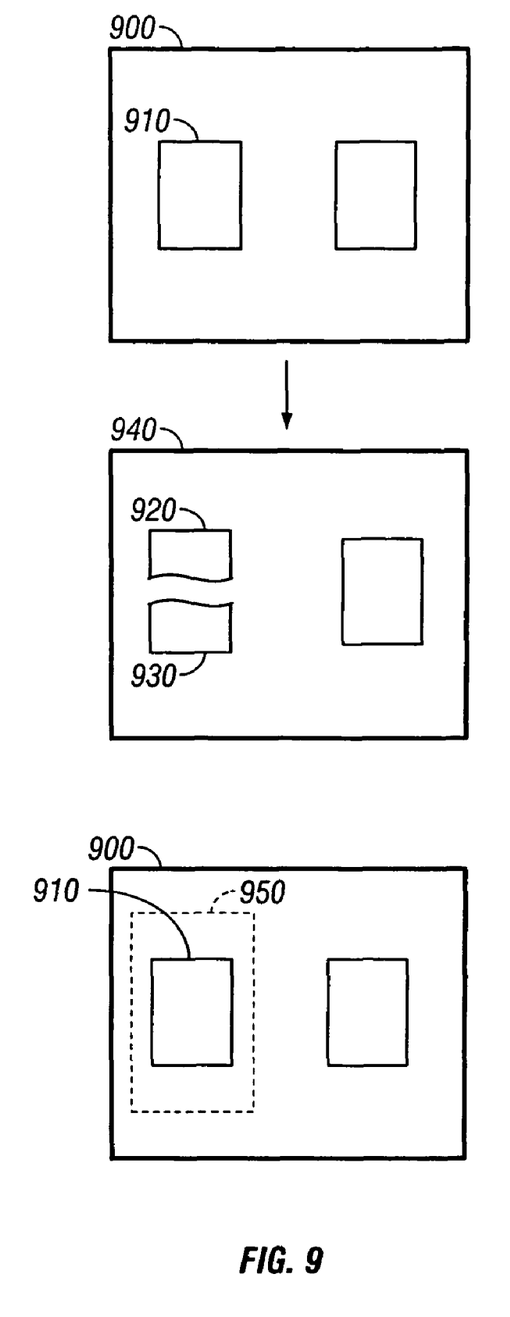
FIG. 9 illustrates merging components.

In some cases, as illustrated in FIG. 9, two components 920 and 930 (instead of one component) are found for a single embedded object 910 within an image 900. This situation can occur, for example, if there is a band of color through the object 910 that is very similar to the background color of the image 900.

One technique for handling this situation is to display the result of the identification process to the user and then prompt the user to specify which objects (if any) to merge.

Another technique for handling this situation involves less user intervention than the first technique. In this technique, the entire identification process is run and the result of the identification 940 is displayed to a user, along with a display of the original scanned image 900. If the user notices that a particular embedded object 910 was identified as two objects 920, 930 instead of one, the user then draws a selection 950 around the misidentified object 910 and re-runs the identification process on the image selection portion 950 in single-object mode. When the identification process is re-run in single-object mode, the segmentation module 140 treats the image selection 950 as a computed component and passes the image selection 950 directly to the processing module 150 for extraction of the object from the image selection 950.

Another technique involves no user intervention. In this technique, the entire identification process is run and then the result of the identification is evaluated to determine whether two or more of the identified objects should be merged together into a single object. The merging test involves checking for the presence of one or more merging conditions. For rectangular objects, such merging conditions include, but are not limited to, components that have edges within some distance of each other, components whose combined size is equivalent to the expected size of the object (for example, two 2"×6" components found for an expected 4"×6" photo), components with jagged boundaries or boundaries that lack right angles (illustrated in FIG. 9). If a group of mergeable objects is found, then the identification process is re-run in single object mode on the image portion that corresponds to the group of mergeable objects.

Alternatively, instead of performing the merging test after the entire identification process has occurred, the merging test may be performed as an additional step in between steps 230 and steps 240 of the method 200. Once the segmentation module 140 finds a component in step 230, instead of immediately passing the component to the processing module 150 in step 240, the segmentation module 140 can instead batch up all the found components and then perform the merging test on the entire batch. That way, by the time the components are passed to the processing module 150, any components that are mergeable will have already been merged.

Splitting

Figure 10A:
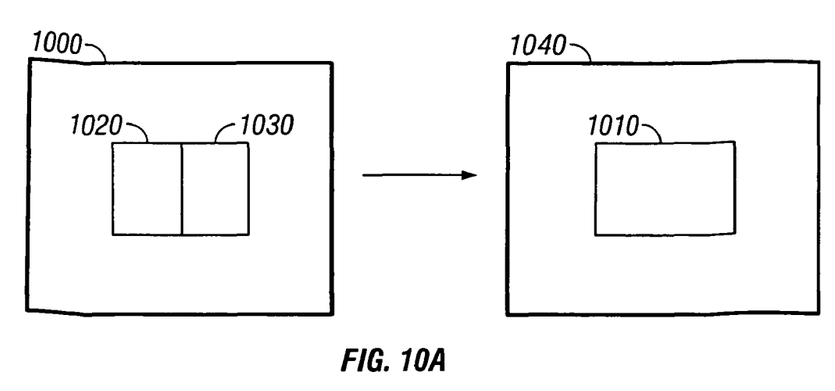
FIGS. 10A and 10B illustrates splitting components.

In some cases, as illustrated in FIG. 10A, the reverse scenario occurs. Instead of finding too many objects, too few objects are found. For example, a single component 1010 (instead of two components) is found for two embedded objects 1020, 1030 within an image 1000. This situation can occur, for example, if the objects are spaced too closely together.

One technique to address this situation is to impose a constraint on the system that requires the embedded objects 120 within the image 110 to have a minimum amount of spacing (for example, ⅛ inch) between them.

Another technique is that the system displays the identification results to the user and then prompts the user to specify which objects to split.

Figure 10B:
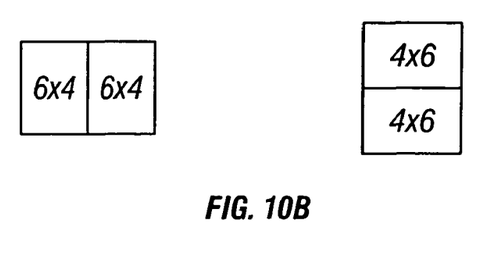

Another technique is that the system examines the identification results and for each identified object, determines whether the object can be split into two or more objects. This determination is made by identifying one or more potential cut lines and determining whether any of the potential cut lines could correspond to an object edge. Various algorithms can be used to identify the potential cut lines. One algorithm uses information about the expected size of the object to determine potential cut lines. For example, as illustrated in FIG. 10B, if the expected object is a rectangular object with a size of 4"×6", but the size of the found objects is 8"×12", this is a strong clue that two objects have been combined into a single object and that a cut should be made down the middle of the combined object.

To determine whether a given cut line corresponds to an object edge, the algorithm uses the gradient values for the pixels along the cut line in the same manner as described above in the computation of edge pixels. To improve robustness, the algorithm evaluates not just a single cut line at a given cut position but also nearby cut lines.

The results of the correction (splitting or merging) are displayed to the user along with the original (uncorrected) result, and the user can choose between the two results. Alternatively, the system can automatically choose between the two results, for example, by comparing the identified objects against a criteria, such as the expected object size.

User Interface (UI)

While the above-described processes can be performed automatically without user intervention, it may be advantageous in some cases to provide a user interface (UI) so that users can configure one or more of the settings used by the process, for example, the threshold setting used in the gradient computation or the tolerance setting used in the component analysis.

The UI also enables users to view the results of the identification process and make adjustments to the results before subsequent operations are performed. Examples of adjustments that can be made through the UI are the merging and splitting adjustments described above. In one implementation, the UI displays the results of the identification process, for example, by displaying an image where each embedded object is identified by a selection marker, such as a rectangular marquee surrounding the object. Users can then move and transform the selection.

The UI can be provided as part of the image processing program that is used on the scanned image. Alternatively, the UI can be incorporated into the scanner software and used to receive user input before or during the scan (or a during a preview of the scan).

Use of the Identification Output in Subsequent Operations

In one implementation, the output of the above-described identification process is used in subsequent image processing operations, for example, cropping, aligning, or rotating the image. In such an implementation, a user scans the image, loads the scanned image into an image processing program, for example, Adobe Photoshop® available from Adobe Systems, of San Jose, Calif., and then selects an image manipulation operation to be performed on the scanned image. In response to the user selection of the image manipulation operation, the image processing program performs the above-described identification technique and then uses the output of the identification technique to seed the image manipulation operation.

Crop Tool

In one implementation, the image manipulation operation is used to seed a crop tool that allows multiple objects to be cropped in a single operation. The crop tool has multiple cropping areas. Each cropping area is seeded with one of the objects identified by the identification technique. By using the output of the identification technique, the crop tool does not require user input specifying the cropping areas.

The cropping areas need not be axis-aligned with the image. In other words, the cropping areas can be at an angle (e.g., a forty-five degree angle) relative to the image. As described above, the output of the identification process includes data that specifies the object's orientation or angle. The cropping tool uses this information to determine the angle of each cropping area.

Once the cropping areas have been defined based on the identification output, the crop tool automatically crops the cropping areas from the image. Alternatively, the crop tool can allow the user to make adjustments to the defined cropping areas before the cropping is performed. Such adjustments include adjusting the position or orientation of the cropping area, merging two cropping areas that were incorrectly identified (as described above under merging) or splitting a single cropping area into two cropping areas.

In one implementation, when the user mouses over a portion of the image that corresponds to one of the cropping areas, the crop tool displays a marquee or other visual marker that identifies the system-defined cropping area. The user can then choose to accept the system-defined cropping area or to modify it.

The invention can be implemented in digital electronic circuitry, or in computer hardware, firmware, software or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results.

What is claimed is:

1. A computer-implemented method for identifying multiple objects within an image, the method comprising:
receiving, in a programmable computer system, an image that includes two or more non-overlapping embedded images from an input device coupled to the programmable computer system;
identifying a plurality of edge pixels in the image based on a respective gradient value associated with each of the plurality of edge pixels, wherein the gradient value of each edge pixel satisfies a first threshold value;
identifying one or more non-edge pixels in the image based on a respective gradient value associated with each of the plurality of non-edge pixels, wherein the gradient value of each non-edge pixel satisfies a second threshold value;
selecting an edge pixel from the plurality of edge pixels;
identifying a substantially connected component that includes non-edge pixels and a plurality of substantially connected edge pixels being substantially connected to the selected edge pixel, wherein a number of non-edge pixels in the substantially connected component is based on a level of tolerance for non-edge pixels; and identifying within the image a bounding area, wherein the bounding area surrounds the substantially connected component.

2. The method of claim 1, wherein identifying a plurality of edge pixels includes computing the respective gradient value for each of a plurality of pixels in the image.

3. The method of claim 2, wherein computing the respective gradient value for each of the plurality of pixels includes, for each pixel, comparing respective pixel colors of a neighborhood of pixels surrounding each pixel.

4. The method of claim 2, wherein computing the respective gradient value for each of the plurality of pixels includes using an image smoothing filter to filter noise from the image.

5. The method of claim 1, further comprising passing the bounding area to a processor that extracts a location of an embedded image from the two or more non-overlapping images.

6. The method of claim 5, further comprising refining the extracted location.

7. The method of claim 6, further comprising using the extracted location to crop the embedded image from the image.

8. The method of claim 1, further comprising splitting the bounding area of the image into a first of the two or more non-overlapping embedded images and a second of the two or more non-overlapping embedded images.

9. The method of claim 1, further comprising merging the bounding area within the image with another bounding area within the image into a single bounding area.

10. The method of claim 1, further comprising:
extracting a location of each of the two or more non-overlapping embedded images from the image; and
using the location to seed a crop operation.

11. The method of claim 10, wherein using the location to seed a crop operation includes:
for each of the two or more non-overlapping embedded images in the image, using the location to define a cropping area; and
cropping all the defined cropping areas in a single cropping operation.

12. The method of claim 11, wherein:
the location specifies an alignment of one of the two or more non overlapping embedded images with respect to the image; and
using the location to define a cropping area includes using the alignment of one of the two or more non overlapping embedded images to define an alignment of the cropping area.

13. The method of claim 11, further comprising:
prior to cropping all the defined cropping areas, adjusting one or more of the defined cropping areas in response to user input.

14. The method of claim 11, further comprising:
prior to cropping all the defined cropping areas, merging two of the defined cropping areas into a single defined cropping area in response to user input.

15. The method of claim 13, wherein adjusting one or more of the defined cropping areas includes splitting a single cropping area into two or more cropping areas.

16. A non-transitory computer program product, tangibly stored on a computer-readable medium, for identifying multiple objects within an image, comprising instructions operable to cause a programmable processor to perform operations comprising:
receiving an image that includes two or more non-overlapping embedded images;
identifying a plurality of edge pixels in the image based on a respective gradient value associated with each of the plurality of edge pixels, wherein the gradient value of each edge pixel satisfies a first threshold value;
identifying one or more non-edge pixels in the image based on a respective gradient value associated with each of the plurality of non-edge pixels, wherein the gradient value of each non-edge pixel satisfies a second threshold value;
selecting an edge pixel from the plurality of edge pixels;
identifying a substantially connected component that includes non-edge pixels and a plurality of substantially connected edge pixels being substantially connected to the selected edge pixel, wherein a number of non-edge pixels in the substantially connected component is based on a level of tolerance for non-edge pixels; and
identifying within the image a bounding area, wherein the bounding area surrounds the substantially connected component.

17. The product of claim 16, wherein identifying a plurality of edge pixels includes computing the respective gradient value for each of a plurality of pixels in the image.

18. The product of claim 17, wherein computing the respective gradient value for each of the plurality of pixels includes, for each pixel, comparing respective pixel colors of a neighborhood of pixels surrounding each pixel.

19. The product of claim 17, wherein computing the respective gradient value for each of the plurality of pixels includes using an image smoothing filter to filter noise from the image.

20. The product of claim 16, wherein the operations further comprise passing the bounding area to a processor that extracts a location of an embedded image from the two or more non-overlapping images.

21. The product of claim 20, wherein the operations further comprise refining the extracted location.

22. The product of claim 21, wherein the operations further comprise using the extracted location to crop the embedded image from the image.

23. The product of claim 16, wherein the operations further comprise splitting the bounding area of the image into a first of the two or more non-overlapping embedded images and a second of the two or more non-overlapping embedded images.

24. The product of claim 16, wherein the operations further comprise merging the bounding area within the image with another bounding area within the image into a single bounding area.

25. The product of claim 16, wherein the operations further comprise:
extracting a location of each of the two or more non-overlapping embedded images from the image; and
using the location to seed a crop operation.

26. The product of claim 25, wherein using the location to seed a crop operation includes:
for each of the two or more non-overlapping embedded images in the image, using the location to define a cropping area; and
cropping all the defined cropping areas in a single cropping operation.

27. The product of claim 26, wherein:
the location specifies an alignment of one of the two or more non overlapping embedded images with respect to the image; and using the location to define a cropping area includes using the alignment of one of the two or more non overlapping embedded images to define an alignment of the cropping area.

28. The product of claim 26, wherein the operations further comprise:
prior to cropping all the defined cropping areas, adjusting one or more of the defined cropping areas in response to user input.

29. The product of claim 26, wherein the operations further comprise:
prior to cropping all the defined cropping areas, merging two of the defined cropping areas into a single defined cropping area in response to user input.

30. The product of claim 28, wherein adjusting one or more of the defined cropping areas includes splitting a single cropping area into two or more cropping areas.

31. A non-transitory computer program product, tangibly stored on a computer-readable medium, for identifying multiple objects within a scanned image, comprising instructions operable to cause a programmable processor to perform operations comprising:
receiving a scanned image that includes multiple non-overlapping embedded images; and
identifying the multiple non-overlapping embedded images by:
(1) generating an edge pixel map of the image based on a respective gradient value associated with each pixel in the scanned image, the edge pixel map identifying each pixel in the scanned image as being an edge pixel or a non-edge pixel, an edge pixel being a pixel having a gradient value satisfying a first threshold value and a non-edge pixel being a pixel satisfying a second threshold value;
(2) scanning the edge pixel map until an edge pixel is found;
(3) identifying a substantially connected component containing the edge pixel, the substantially connected component being a set of edge pixels that are substantially connected by traversing adjacent edge pixels and adjacent non-edge pixels, wherein a number of non-edge pixels in the substantially connected component is based on a level of tolerance for non-edge pixels;
(4) identifying within the image a bounding area surrounding the substantially connected component, and extracting one of the multiple non-overlapping embedded images based on the bounding area;
(5) erasing from the edge pixel map all the pixels that belong to the substantially connected component or that correspond to pixels inside the extracted one of the multiple non-overlapping embedded images; and
(6) repeating steps (2) through (5) until no more edge pixels are found.

32. The method of claim 1 further comprising setting the tolerance level based on a user input.

33. The method of claim 1 further comprising automatically determining the tolerance level as a function of a spacing between the objects.

34. The product of claim 16, further comprising instructions operable to cause the programmable processor to set the tolerance level based on a user input.

35. The product of claim 16, further comprising instructions operable to cause the programmable processor to automatically determine the tolerance level as a function of a spacing between the embedded images.

36. The product of claim 31, further comprising instructions operable to cause the programmable processor to set the tolerance level based on a user input.

37. The product of claim 31, further comprising instructions operable to cause the programmable processor to automatically determine the tolerance level as a function of a spacing between the embedded images.

38. A system comprising:
a display device;
a machine-readable storage device including a program product; and
one or more processors operable to execute the program product, interact with the display device, and perform operations comprising:
receiving an image that includes two or more non-overlapping embedded images;
identifying a plurality of edge pixels in the image based on a respective gradient value associated with each of the plurality of edge pixels, wherein the gradient value of each edge pixel satisfies a first threshold value;
identifying one or more non-edge pixels in the image based on a respective gradient value associated with each of the plurality of non-edge pixels, wherein the gradient value of each non-edge pixel satisfies a second threshold value;
selecting an edge pixel from the plurality of edge pixels;
identifying a substantially connected component that includes non-edge pixels and a plurality of substantially connected edge pixels being substantially connected to the selected edge pixel, wherein a number of non-edge pixels in the substantially connected component is based on a level of tolerance for non-edge pixels; and
identifying within the image a bounding area, wherein the bounding area surrounds the substantially connected component.

39. The system of claim 38 wherein identifying a plurality of edge pixels includes computing the respective gradient value for each of a plurality of pixels in the image.

40. The system of claim 39 wherein computing the respective gradient value for each of the plurality of pixels includes, for each pixel, comparing respective pixel colors of a neighborhood of pixels surrounding each pixel.

41. The system of claim 39 wherein computing the respective gradient value for each of the plurality of pixels includes using an image smoothing filter to filter noise from the image.

42. The system of claim 38 wherein the one or more processors are operable to perform operations further comprising extracting a location of an embedded image from the two or more non-overlapping images.

43. The system of claim 42 wherein the one or more processors are operable to perform operations further comprising refining the extracted location.

44. The system of claim 38 wherein the one or more processors are operable to perform operations further comprising using the extracted location to crop the embedded image from the image.

45. The system of claim 38 wherein the one or more processors are operable to perform operations further comprising splitting the bounding area of the image into a first of the two or more non-overlapping embedded images and a second of the two or more non-overlapping embedded images.

46. The system of claim 38 wherein the one or more processors are operable to perform operations further comprising merging the bounding area within the image with another bounding area within the image into a single bounding area.

47. The system of claim 38 wherein the one or more processors are operable to perform operations further comprising:
  extracting a location of each of the two or more non-overlapping embedded images from the image; and
  using the location to seed a crop operation.

48. The system of claim 47 wherein using the location to seed a crop operation includes:
  for each of the two or more non-overlapping embedded images in the image, using the location to define a cropping area; and
  cropping all the defined cropping areas in a single cropping operation.

49. The system of claim 48 wherein:
  the location specifies an alignment of one of the two or more non overlapping embedded images with respect to the image; and
  using the location to define a cropping area includes using the alignment of one of the two or more non overlapping embedded images to define an alignment of the cropping area.

50. The system of claim 48 wherein the one or more processors are operable to perform operations further comprising:
  prior to cropping all the defined cropping areas, adjusting one or more of the defined cropping areas in response to user input.

51. The system of claim 48 wherein the one or more processors are operable to perform operations further comprising:
  prior to cropping all the defined cropping areas, merging two of the defined cropping areas into a single defined cropping area in response to user input.

52. The system of claim 50 wherein adjusting one or more of the defined cropping areas includes splitting a single cropping area into two or more cropping areas.

\* \* \* \* \*